(12) United States Patent
Inoue

(10) Patent No.: US 12,221,086 B2
(45) Date of Patent: Feb. 11, 2025

(54) POWER SUPPLY SYSTEM

(71) Applicant: TOYOTA JIDOSHA KABUSHIKI KAISHA, Toyota (JP)

(72) Inventor: Kazutoshi Inoue, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/455,897

(22) Filed: Aug. 25, 2023

(65) Prior Publication Data

US 2024/0157916 A1 May 16, 2024

(30) Foreign Application Priority Data

Nov. 15, 2022 (JP) .................................. 2022-182873

(51) Int. Cl.
| | |
|---|---|
| *B60T 8/17* | (2006.01) |
| *B60R 16/03* | (2006.01) |
| *H02J 7/00* | (2006.01) |
| *H02J 7/34* | (2006.01) |

(52) U.S. Cl.
CPC ................ *B60T 8/17* (2013.01); *B60R 16/03* (2013.01); *H02J 7/0029* (2013.01); *H02J 7/0047* (2013.01); *H02J 7/00712* (2020.01); *H02J 7/34* (2013.01)

(58) Field of Classification Search
CPC ......... B60T 8/17; B60R 16/03; B60R 16/033; H02J 7/0029; H02J 7/0047; H02J 7/00712; H02J 7/34; H02J 7/007; H02J 9/06; H02J 9/04; H02J 9/068; H02J 1/10; H02J 1/102

See application file for complete search history.

(56) References Cited

U.S. PATENT DOCUMENTS

| | | | |
|---|---|---|---|
| 2020/0189414 A1 | 6/2020 | Morita | |
| 2022/0234471 A1* | 7/2022 | Morita | ..................... H02J 7/00 |
| 2023/0192017 A1* | 6/2023 | Mitani | ................... H02J 7/345 |
| | | | 307/23 |
| 2023/0198289 A1* | 6/2023 | Matsumoto | ............ H02J 9/068 |

(Continued)

FOREIGN PATENT DOCUMENTS

| | | |
|---|---|---|
| JP | 2006-174579 A | 6/2006 |
| JP | 2018-062253 A | 4/2018 |

(Continued)

*Primary Examiner* — Daniel Kessie
*Assistant Examiner* — Terrence R Willoughby
(74) *Attorney, Agent, or Firm* — SoraIP, Inc.

(57) ABSTRACT

In the power supply system, DC/DC converter may perform a first operation of converting a voltage of the output node into a charging voltage and supplying the charging voltage to the sub power supply, and a second operation of converting a voltage of the sub power supply into an output voltage and supplying the output voltage to the output node. The load is connected to the output node via a power supply line, and includes a voltage detection unit that detects a voltage output from the power supply line. Control unit (control unit and the control unit) is to conduct the first switch, by causing DC/DC converter to execute the first operation, to charge the sub power supply, after charging the sub power supply, switching the first switch to non-conductive, DC/DC converter to execute the second operation, detects an abnormality based on the voltage detected by the voltage detection unit.

4 Claims, 5 Drawing Sheets

(56) References Cited

U.S. PATENT DOCUMENTS

| | | | | |
|---|---|---|---|---|
| 2023/0198290 A1* | 6/2023 | Kobayashi | ............. | B60L 58/14 307/23 |
| 2024/0302441 A1* | 9/2024 | Morita | ................. | H02J 7/0047 |

FOREIGN PATENT DOCUMENTS

| | | | |
|---|---|---|---|
| JP | 2022-072398 A | 5/2022 | |
| JP | 2022-160916 A | 10/2022 | |

* cited by examiner (COMPARATIVE EXAMPLE)

(COMPARATIVE EXAMPLE)

POWER SUPPLY SYSTEM

CROSS-REFERENCE TO RELATED APPLICATION

This application claims priority to Japanese Patent Application No. 2022-182873 filed on Nov. 15, 2022, incorporated herein by reference in its entirety.

BACKGROUND

1. Technical Field

The present disclosure relates to a power supply system.

2. Description of Related Art

As a power supply mounted on a vehicle or the like, a redundant power supply is known that supplies electric power to a load from a sub power supply when a main power supply fails. Japanese Unexamined Patent Application Publication No. 2022-160916 (JP 2022-160916 A) discloses a power supply device including a first system, a second system, an inter-system switch, a current supply unit, and a disconnection detection unit. The first system supplies electric power of a first power supply to a load. The second system supplies electric power of a second power supply to a load. The inter-system switch is capable of connecting and disconnecting a connection path connecting the first system and the second system. The current supply unit constantly supplies a current to a specific path between a connection point between the connection path and the second system, and the second power supply. The disconnection detection unit detects disconnection of the specific path in accordance with the presence or absence of a current flowing in the specific path.

SUMMARY

In order to reliably perform backup by the redundant power supply, it is desired to detect disconnection of a power supply line connecting the redundant power supply and a load to be backed up. As an example of a disconnection detection method, a technique is conceivable in which power is supplied from a main power supply to a load via an internal path of the redundant power supply and the power supply line, and it is determined to have an abnormality when a voltage on the load side is lower than a threshold value. In this technique, even when the power supply line is not disconnected, the voltage on the load side may be lower than the threshold value in the worst case, and there is a possibility that an abnormality is erroneously detected.

An object of the present disclosure is to provide a power supply system capable of suppressing erroneous detection of an abnormality.

In order to solve the above issue, a power supply system according to an aspect of the present disclosure includes: a main power supply; a sub power supply that is chargeable and dischargeable; a first switch that switches whether to conduct electricity between the main power supply and an output node; a direct current-direct current converter that is able to perform a first operation and a second operation, the first operation being an operation of converting a voltage of the output node into a charge voltage and supplying the charge voltage to the sub power supply, and the second operation being an operation of converting a voltage of the sub power supply into an output voltage and supplying the output voltage to the output node; a load including a voltage detection unit that detects a voltage output from a power supply line, the load being connected to the output node via the power supply line; and a control unit that controls the first switch and the direct current-direct current converter. The control unit causes the first switch to conduct electricity and causes the direct current-direct current converter to perform the first operation to charge the sub power supply. After the sub power supply is charged, the control unit switches the first switch to a non-conductive state, causes the direct current-direct current converter to perform the second operation, and detects an abnormality based on the voltage detected by the voltage detection unit.

According to the present disclosure, it is possible to provide a power supply system capable of suppressing erroneous detection of an abnormality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
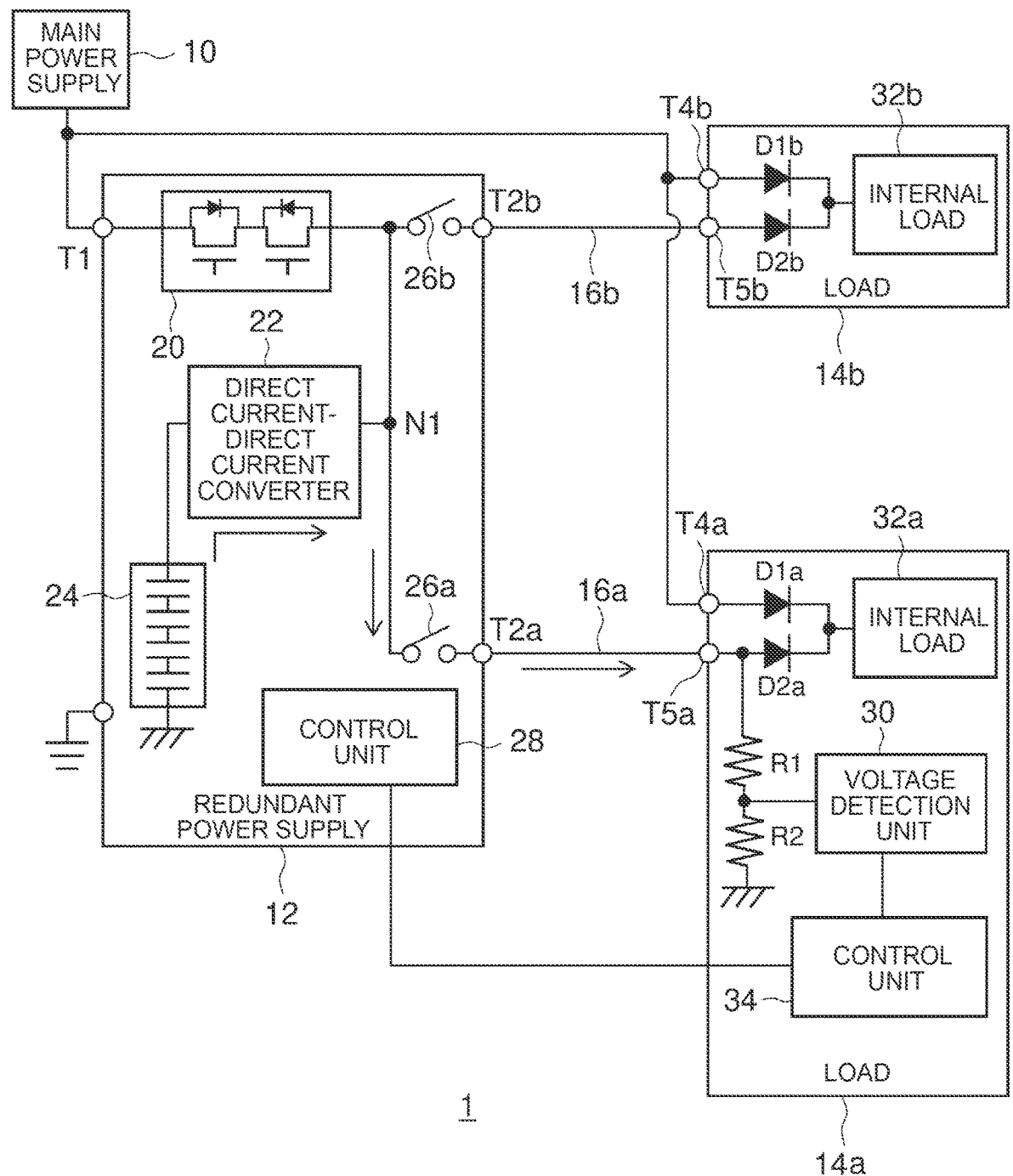
FIG. 1 is a diagram schematically illustrating a configuration of a power supply system according to an embodiment.

FIG. 1 schematically illustrates a configuration of a power supply system 1 according to an embodiment. The power supply system 1 is mounted on a vehicle (not shown), for example, and supplies power to each unit of the vehicle. The vehicle may be a vehicle driven by a driver or an autonomous vehicle.

The power supply system 1 includes a main power supply 10, a redundant power supply 12, a load 14a, a load 14b, a power supply line 16a, and a power supply line 16b. Hereinafter, the load 14a and the load 14b will be collectively referred to as "load 14" as appropriate. The power supply line 16a and the power supply line 16b are collectively referred to as a "power supply line 16" as appropriate.

The main power supply 10 is a chargeable and dischargeable power storage device, and is, for example, a lead storage battery. The main power supply 10 is charged by electric power from a generator (such as an alternator) (not shown) mounted on the vehicle. The generator generates electric power by receiving a driving force from a driving force source such as an engine mounted on the vehicle.

The main power supply 10 is electrically connected to each of the load 14a and the load 14b. Although two loads 14 are illustrated in FIG. 1, the main power supply 10 may be connected to any number of loads 14. When the main power supply 10 is normal, that is, when the main power supply 10 does not fail, the main power supply 10 is capable of supplying power to each of the load 14a and the load 14b. The load 14a and the load 14b are to be backed up, and will be described later.

The main power supply 10 is also electrically connected to the redundant power supply 12. The redundant power supply 12 is also referred to as an integrated redundant power supply or Second Battery Module (SBM). The redundant power supply 12 is also electrically connected to the load 14a by a power supply line 16a such as a wire harness, and is electrically connected to the load 14b by a power supply line 16b.

The redundant power supply 12 includes a first switch 20, a direct current-direct current converter 22, a sub power supply 24, a second switch 26a, a second switch 26b, a control unit 28, a power terminal T1, a power supply terminal T2a, and a power supply terminal T2b.

For example, when an ignition switch (not shown) of the vehicle is turned on, the redundant power supply 12 charges the sub power supply 24 with electric power supplied from the main power supply 10. After the sub power supply 24 is charged, when the main power supply 10 fails due to, for example, a ground fault, the redundant power supply 12 supplies the power of the sub-power supply 24 to each of the load 14a and the load 14b via the power supply line 16a and the power supply line 16b. Thus, the load 14a and the load 14b can operate even when the main power supply 10 fails.

The sub power supply 24 is a chargeable and dischargeable power storage device, and is constituted by, for example, a power storage element such as an electric double layer capacitor. The sub power supply 24 may be a secondary battery such as a lithium-ion battery or a nickel-metal hydride battery.

The first switch 20 includes, for example, a semiconductor switch element. The first switch 20 may be configured by a relay or the like. The first switch 20 is connected between the power terminal T1 and the output node N1. The first switch 20 switches whether or not the main power supply 10 connected to the power terminal T1 is electrically connected to the output node N1.

The direct current-direct current converter 22 is connected between the sub power supply 24 and the output node N1. The direct current-direct current converter 22 is a bi-directional direct current-direct current converter capable of boosting and lowering. the direct current-direct current converter 22 is capable of performing a first operation of converting the voltage of the output node N1 into a charging voltage and supplying the charging voltage to the sub power supply 24, and a second operation of converting the voltage of the sub power supply 24 into an output voltage and supplying the output voltage to the output node N1. The values of the charging voltage and the output voltage can be appropriately determined by experiment or simulation.

Each of the second switch 26a and the second switch 26b includes, for example, a semiconductor-switching device or a relay. The second switch 26a is connected between the output node N1 and the power supply terminal T2a. The second switch 26a switches whether or not the power supply terminal T2a is electrically connected to the output node N1.

The second switch 26b is connected between the output node N1 and the power supply terminal T2b. The second switch 26b switches whether or not the power supply terminal T2b is electrically connected to the output node N1.

The control unit 28 controls the first switch 20, the direct current-direct current converter 22, the second switch 26a, and the second switch 26b.

The power supply terminal T2a is connected to the power terminal T5a of the load 14a by the power supply line 16a. In other words, the load 14a is connected to the output node N1 via the power supply line 16a and the second switch 26a.

The load 14a is, for example, an electric braking system of vehicles. The load 14a includes a first rectifier element D1a, a second rectifier element D2a, a voltage detection unit 30, an internal load 32a, a control unit 34, a first resistor R1, a second resistor R2, a power terminal T4a, and a power terminal T5a.

The first rectifier element D1a is, for example, a diode. An anode of the first rectifier element D1a is connected to a power terminal T4a connected to the main power supply 10. The cathode of the first rectifier element D1a is connected to the power supply of the internal load 32a.

The second rectifier element D2a is, for example, a diode. An anode of the second rectifier element D2a is connected to the power terminal T5a. The cathode of the second rectifier element D2a is connected to the cathode of the first rectifier element D1a.

The internal load 32a includes various loads related to the electric brake, for example, a brake Electronic Control Unit (ECU) that executes a process related to control of the electric brake, and an actuator for operating the electric brake. The internal load 32a operates with power supplied to the power supply node as a power supply. Since the internal load 32a has a known configuration, further detailed explanation will be omitted.

The first resistor R1 has one end connected to the power terminal T5a and the other end connected to one end of the second resistor R2. The second resistor R2 has one end connected to the other end of the first resistor R1 and the other end connected to grounding.

The voltage detection unit 30 detects a voltage of a node connecting the first resistor R1 and the second resistor R2. This corresponds to the voltage detection unit 30 detecting the voltage outputted from the power supply line 16a. The voltage detection unit 30 supplies the value of the detected voltage to the control unit 34.

The control unit 34 detects disconnection of the power supply line 16a based on the voltage detected by the voltage detection unit 30.

The configuration of the control unit 28 and the control unit 34 can be realized by cooperation of hardware resources and software resources or by only hardware resources. Analogue devices, microcomputers, DSP, ROM, RAM, ASIC, FPGA, and other LSI can be used as hardware resources. A program such as firmware can be used as a software resource. The control unit 28 may have the function of the control unit 34.

The power supply terminal T2b of the redundant power supply 12 is connected to the power terminal T5b of the load 14b by the power supply line 16b. In other words, the load 14b is connected to the output node N1 via the power supply line 16b and the second switch 26b.

The load 14b is, for example, a door unlock system of a vehicle. The load 14b includes a first rectifier element D1b, a second rectifier element D2b, an internal load 32b, a power terminal T4b, and a power terminal T5b.

An anode of the first rectifier element D1b is connected to a power terminal T4b connected to the main power supply 10. The cathode of the first rectifier element D1b is connected to the power supply of the internal load 32b.

An anode of the second rectifier element D2b is connected to the power terminal T5b. The cathode of the second rectifier element D2b is connected to the cathode of the first rectifier element D1b.

The internal load 32b includes various loads such as a body ECU and an actuator that execute processes related to door unlocking, for example. The internal load 32*b* operates with power supplied to the power supply node as a power supply.

Although not shown, the load 14*b* also includes a configuration equivalent to the voltage detection unit 30, the control unit 34, the first resistor R1, and the second resistor R2 of the load 14*a*, and can detect disconnection of the power supply line 16*b*. Explanation of detecting disconnection of the power supply line 16*b* is omitted.

In addition to these loads 14, the power supply system 1 may further include various loads requiring backup, such as a shift-by-wire system, for example.

When the ignition switch of the vehicle is turned on, the control unit 28 causes the first switch 20 to be turned on and causes the direct current-direct current converter 22 to perform the first operation, thereby charging the sub power supply 24. The direct current-direct current converter 22 charges the sub power supply 24 with the electric power of the main power supply 10. At this time, the control unit 28 may make the second switch 26*a* and the second switch 26*b* conductive or non-conductive.

The control unit 28 detects completion of charging of the sub power supply 24. For detecting completion of charging of the sub power supply 24, a known technique can be used, for example, the voltage of the sub power supply 24 may be monitored by a voltage sensor (not shown), and whether or not charging is completed may be determined based on the voltage. After charging of the sub power supply 24 is completed, the control unit 28 switches the first switch 20 to non-conductive state, makes the second switch 26*a* and the second switch 26*b* conductive state, and causes the direct current-direct current converter 22 to perform the second operation. The direct current-direct current converter 22 supplies the output voltage obtained by converting the voltage of the sub power supply 24 to the load 14*a* and the load 14*b*.

When the direct current-direct current converter 22 performs the second operation, the control unit 28 outputs a control signal to the control unit 34 of the load 14*a*.

Upon receiving the control signal from the control unit 28, the control unit 34 detects an abnormality based on the voltage detected by the voltage detection unit 30. The error is a disconnection of the power supply line 16*a*. The control unit 34 compares the voltage detected by the voltage detection unit 30 with a predetermined abnormality determination value. When the voltage detected by the voltage detection unit 30 is equal to or lower than the abnormality determination value, the control unit 34 determines that an abnormality has occurred. When the voltage detected by the voltage detection unit 30 is higher than the abnormality determination value, the control unit 34 determines that an abnormality has not occurred. The abnormality determination value can be appropriately determined by experiment or simulation so that disconnection is appropriately detected. When an anomaly is detected, the control unit 34 executes a predetermined process such as recording diagnosis data indicating disconnection of the power supply line 16*a*.

When the abnormality detection is executed, the control unit 34 notifies the control unit 28 of the redundant power supply 12 of a control signal indicating completion of the abnormality detection. Upon receiving the control signal from the control unit 34, the control unit 28 switches the second switch 26*a* and the second switch 26*b* to the non-conductive state while the direct current-direct current converter 22 continues the second operation, and monitors the presence or absence of a failure of the main power supply 10. As a result, the electric power stored in the sub power supply 24 can be held, and the main power supply 10 can be prepared for failure.

A known technique can be used to detect a failure of the main power supply 10. For example, a voltage sensor (not shown) may monitor the voltage of the power terminal T1, and the control unit 28 may periodically determine the presence or absence of a failure based on the voltage. When the voltage of the power terminal T1 is equal to or lower than the predetermined failure determination value, the control unit 28 determines that the main power supply 10 has failed. When the voltage of the power terminal T1 is higher than the failure determination value, the control unit 28 determines that the main power supply 10 has not failed. The failure determination value can be appropriately determined by an experiment or a simulation so that a power failure is appropriately detected.

When the main power supply 10 fails, the control unit 28 makes the second switch 26*a* and the second switch 26*b* conductive. In the event of a power failure, since the direct current-direct current converter 22 is performing the second operation, the power of the sub power supply 24 can be immediately supplied to the loads 14 without waiting for the direct current-direct current converter 22 to begin operating.

On the other hand, when the main power supply 10 is not failed, the control unit 28 keeps the second switch 26*a* and the second switch 26*b* non-conductive.

Figure 2:
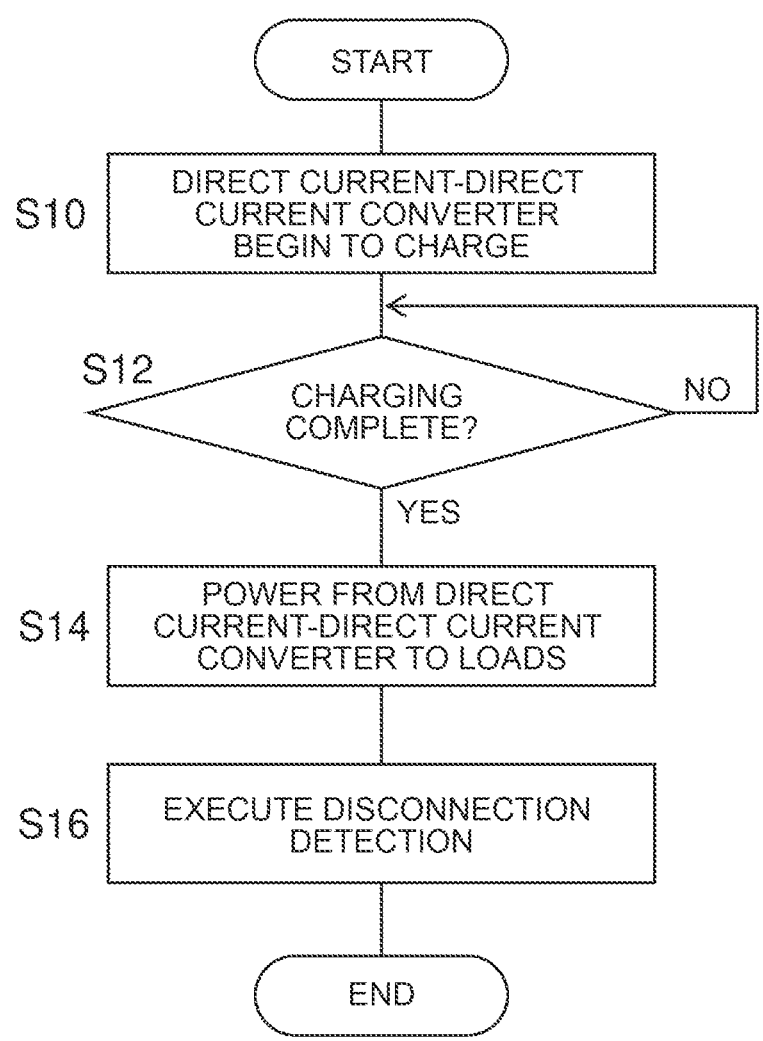
FIG. 2 is a flowchart illustrating a process related to disconnection detection of the power supply system of FIG. 1.

Next, an overall operation of the power supply system 1 having the above-described configuration will be described. FIG. 2 is a flowchart illustrating a process related to disconnection detection of the power supply system 1 of FIG. 1. The process of FIG. 2 is started when the ignition switch is switched from off to on.

The control unit 28 turns on the first switch 20 and starts charging the sub power supply 24 by the direct current-direct current converter 22 (S10). The control unit 28 determines whether or not the sub power supply 24 has been charged (S12). If the charge is not completed (N in S12), the process returns to S12.

When charging of the sub power supply 24 is completed (S12 Y), the control unit 28 turns off the first switch 20, turns on the second switch 26*a* and the second switch 26*b*, and supplies power from the direct current-direct current converter 22 to the loads 14 (S14). The control unit 34 performs disconnection detection (S16), and ends the process.

Figure 3:
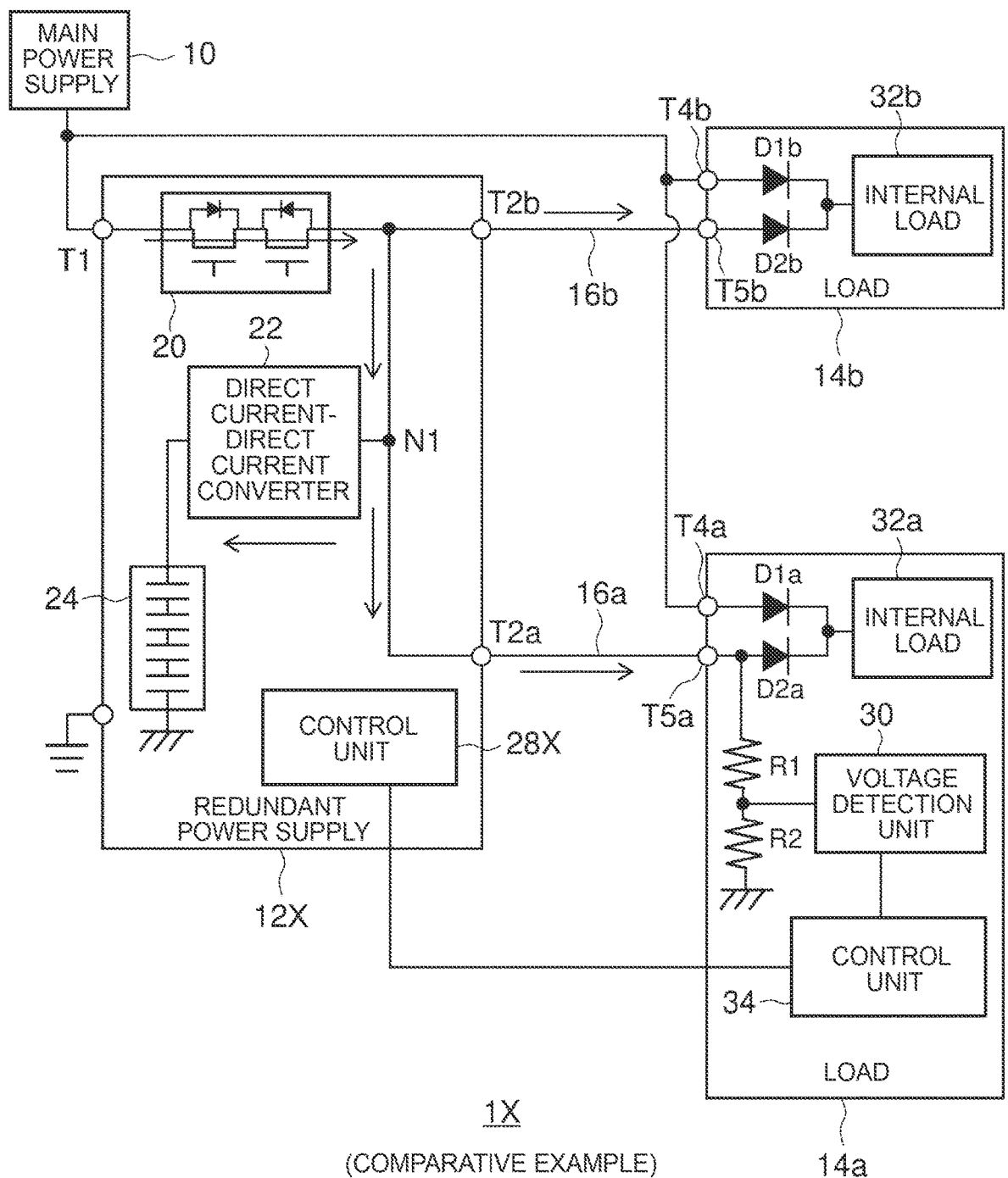
FIG. 3 is a diagram schematically illustrating a configuration of a power supply system according to a comparative example.

Here, the power supply system of the comparative example will be described. FIG. 3 schematically illustrates a configuration of a power supply system 1X according to a comparative embodiment. The configuration of the power supply system 1X of the comparative example is basically the same as that of the embodiment of FIG. 1, but the control by the control unit 28X differs from that of the embodiment as described below. In FIG. 3, the second switch 26*a*, 26*b* is omitted, and the second switch is conducted.

Figure 4:
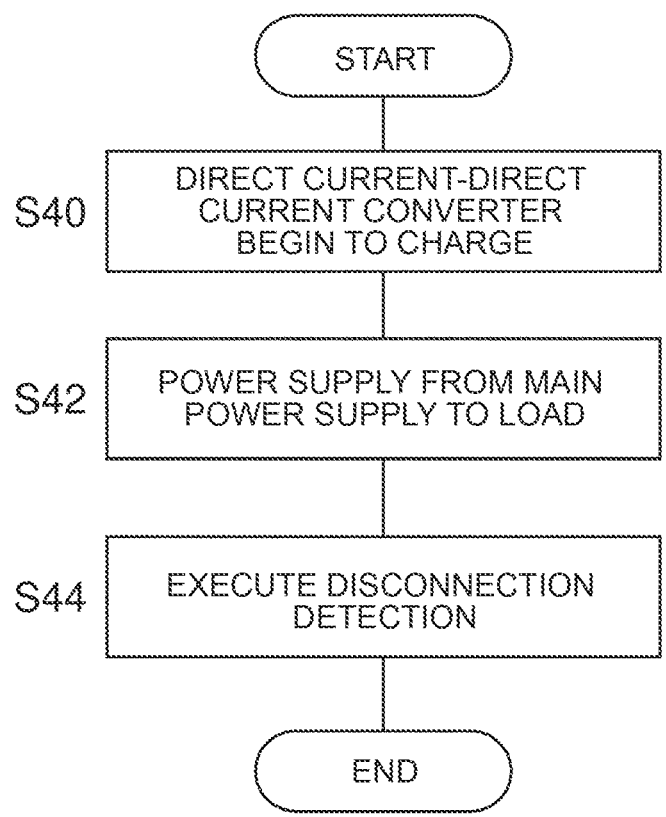
FIG. 4 is a flowchart illustrating a process related to disconnection detection of the power supply system of the comparative example.

FIG. 4 is a flow chart illustrating a process related to detecting disconnection of a power supply system 1X according to a comparative embodiment. The process of FIG. 4 is started when the ignition switch is switched from off to on.

The control unit 28X turns on the first switch 20 and starts charging the sub power supply 24 by the direct current-direct current converter 22 (S40). The power supply system 1X supplies power from the main power supply 10 to the loads 14 (S42). In S42, the power of the main power supply 10 is passed through the path inside the redundant power supply 12X and is supplied to the loads 14. In this condition, the control unit 34 of the load 14a performs disconnection detection (S44), and ends the process.

That is, while the direct current-direct current converter 22 performs the first operation and the sub power supply 24 is charged by the power of the main power supply 10, the voltage is detected by the load 14a based on the power supplied from the main power supply 10 to the load 14a via the first switch 20 in the on-state, and disconnection detection is performed. The current path at this time is indicated by arrows in FIG. 3.

Figure 5:
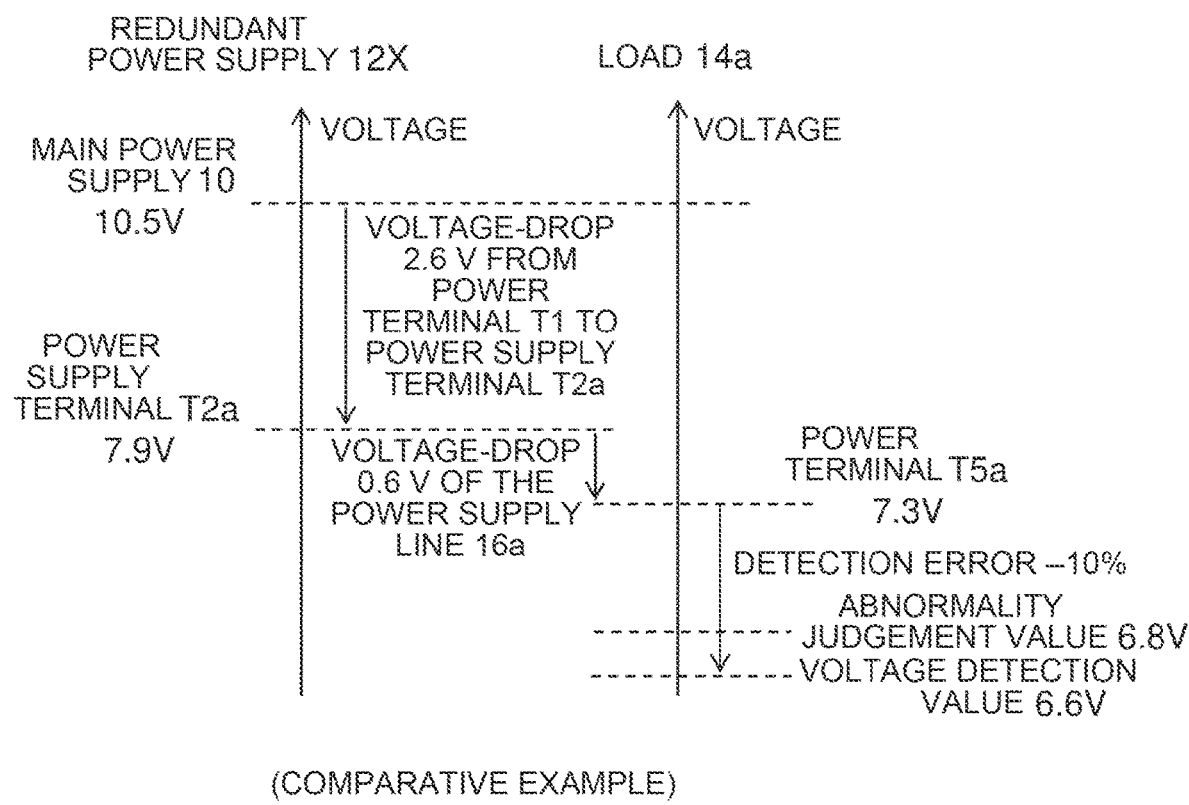
FIG. 5 is a diagram for explaining an example of a voltage of each unit when a disconnection is detected in the power supply system of comparative example.

FIG. 5 is a diagram for explaining an example of a voltage of each unit when a disconnection is detected in the power supply system 1X of the comparative example. FIG. 5 shows the worst case voltage.

In the worst case, it is assumed that, for example, the voltage of the main power supply 10 has decreased to 10.5 V due to degradation of the main power supply 10 or the like. Further, it is assumed that a voltage drop occurs due to the charge current of the sub power supply 24 flowing through the wire resistor of the current path from the power terminal T1 to the power supply terminal T2a, and the voltage drop is 2.6 V. Here, the power supply terminal T2a of the redundant power supply 12 is 7.9 V.

Assuming that the voltage drop due to the power supply line 16a is 0.6 V, the voltage at the power terminal T5a of the load 14a is 7.3 V.

Assuming that the variation of the detection value of the voltage by the voltage detection unit 30 is ±10%, the detection value of the voltage in the worst case is 6.6 V. The detected value of the voltage is a value converted into the voltage of the power terminal T5a based on the voltage division ratio of the first resistor R1 and the second resistor R2. For example, assuming that the abnormality determination value is 6.8 V, in the worst case of FIG. 5, even when the power supply line 16a is not disconnected, it is erroneously detected that there is disconnection.

Although not included in FIG. 5, even when the internal load 32b of the load 14b operates when the disconnection is detected, and the power of the main power supply 10 passes through the internal path of the redundant power supply 12X and is supplied to the load 14b, the voltage of the power terminal T5a of the load 14a decreases.

Here, if the charge current of the sub power supply 24 is reduced, the voltage drop from the power terminal T1 to the power supply terminal T2a is reduced, and it is considered that the voltage drop is less likely to be erroneously detected than in the comparative example. However, when there is a limit to the time from when the ignition switch is turned on to when the sub power supply 24 completes charging, it is difficult to reduce the charging current. For example, in a remote parking system, there is a limit on the time from when the user activates the remote parking application at the terminal until when the vehicle starts. Therefore, it is necessary to complete charging of the sub power supply 24 within a predetermined time and perform disconnection detection.

Further, by setting the abnormality determination value to be low, it is considered that even if the voltage decreases in the worst case, it is less likely to be erroneously detected than the comparative example. However, if the abnormality determination value is lowered, there is a possibility that the discrimination accuracy of whether or not the circuit is disconnected is deteriorated.

On the other hand, in the embodiment, after the sub power supply 24 is charged, the first switch 20 is switched to non-conductive state, the direct current-direct current converter 22 is caused to perform the second operation, and an anomaly is detected based on the voltage supplied to the load 14a. Therefore, an anomaly can be detected based on the output voltage of the direct current-direct current converter 22 which is more stable than the voltage of the main power supply 10. The voltage supplied from the redundant power supply 12 to the load 14a does not have a voltage drop due to a current for charging the sub power supply 24.

Thus, when the power supply line 16a is not disconnected, it is possible to prevent the voltage supplied to the load 14a from being excessively lowered even in the worst case. Therefore, erroneous detection of disconnection can be suppressed with respect to the comparative example.

Further, it is not necessary to change the charging current of the sub power supply 24 and the abnormality determination value for the disconnection detection from the comparative example. Therefore, it is possible to suppress erroneous detection of disconnection while keeping the charging time of the sub power supply 24 and the identification accuracy of the presence or absence of disconnection equal to those of the comparative example. Further, the abnormality detection can be executed every time the ignition switch is turned on.

The present disclosure has been described with reference to the embodiments. Note that the embodiments are merely an example. It is to be understood by those skilled in the art that various modifications are possible by combining the components and the processing processes and that such modifications are also within the scope of the present disclosure.

What is claimed is:

1. A power supply system comprising:
   a main power supply;
   a sub power supply configured to be chargeable and dischargeable;
   a first switch configured to switch whether to conduct electricity between the main power supply and an output node;
   a second switch configured to switch whether to conduct electricity between the output node and the power supply line;
   a direct current-direct current converter configured to perform a first operation and a second operation, the first operation being an operation of converting a voltage of the output node into a charge voltage and supplying the charge voltage to the sub power supply, and the second operation being an operation of converting a voltage of the sub power supply into an output voltage and supplying the output voltage to the output node;
   a load including
      a voltage detector configured to detect a voltage output from a power supply line, the load being connected to the output node via the power supply line,
      an internal load,
      a first rectifier element, the first rectifier element including an anode connected to the main power supply, and a cathode connected to a power supply node of the internal load, and
      a second rectifier element, the second rectifier element including an anode connected to the power supply line, and a cathode connected to the cathode of the first rectifier element; and
   a processor configured to control the first switch, the second switch and the direct current-direct current converter,
   wherein the processor is configured to cause the first switch to conduct electricity and cause the direct current-direct current converter to perform the first operation to charge the sub power supply and cause the second switch to conduct electricity to perform abnormality detection, switch the second switch to a non-conductive state in a state in which the direct current-direct current converter is caused to perform the second operation, after the abnormality detection is performed, and monitor presence or absence of a failure of the main power supply, and wherein, after the sub power supply is charged, the processor is configured to switch the first switch to a non-conductive state, cause the direct current-direct current converter to perform the second operation, and detect an abnormality based on the voltage detected by the voltage detector.

2. The power supply system according to claim 1, wherein the processor is configured to cause the second switch to conduct electricity in response to the main power supply failing.

3. The power supply system according to claim 1, wherein:

the power supply system is mounted on a vehicle; and
in response to an ignition switch of the vehicle turning on, the processor is configured to cause the first switch to conduct electricity and cause the direct current-direct current converter to perform the first operation to charge the sub power supply.

4. The power supply system according to claim 3, wherein the load is an electric braking system of the vehicle.

* * * * *